US012387891B2

(12) United States Patent
Best et al.

(10) Patent No.: US 12,387,891 B2
(45) Date of Patent: Aug. 12, 2025

(54) PHASE CHANGE NANO ELECTRO-MECHANICAL RELAY

(71) Applicant: CARNEGIE MELLON UNIVERSITY, Pittsburgh, PA (US)

(72) Inventors: James Best, Pittsburgh, PA (US); Gianluca Piazza, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/457,133

(22) Filed: Aug. 28, 2023

(65) Prior Publication Data

US 2024/0062975 A1 Feb. 22, 2024

Related U.S. Application Data

(62) Division of application No. 17/294,906, filed as application No. PCT/US2019/067128 on Dec. 18, 2019, now Pat. No. 11,742,162.

(60) Provisional application No. 62/917,630, filed on Dec. 19, 2018.

(51) Int. Cl.
*H01H 37/36* (2006.01)
*H01H 1/00* (2006.01)

(52) U.S. Cl.
CPC .......... *H01H 37/36* (2013.01); *H01H 1/0094* (2013.01); *H01H 2300/036* (2013.01)

(58) Field of Classification Search
CPC . H01H 37/36; H01H 1/0094; H01H 2300/036
USPC .......................................................... 337/298
See application file for complete search history.

(56) References Cited

U.S. PATENT DOCUMENTS

| | | | | |
|---|---|---|---|---|
| 2,022,907 | A * | 12/1935 | Worley | H01H 37/38 337/320 |
| 3,743,993 | A * | 7/1973 | Alley | H01H 81/02 374/E5.001 |
| 4,727,348 | A * | 2/1988 | Okazaki | H01H 37/761 337/403 |
| 5,903,099 | A | 5/1999 | Johnson | |
| 6,583,711 | B2 * | 6/2003 | Yang | H01H 9/10 337/123 |

(Continued)

OTHER PUBLICATIONS

Author Unknown, "Chalcogenide Glass," Wikipedia [online], (Oct. 10, 2018): 4 pages, Retrieved on Mar. 31, 2020.

(Continued)

*Primary Examiner* — Anatoly Vortman
(74) *Attorney, Agent, or Firm* — KDW FIRM PLLC

(57) ABSTRACT

A MEMS/NEMS actuator based on a phase change material is described in which the volumetric change observed when the phase change material changes from a crystalline phase to an amorphous phase is used to effectuate motion in the device. The phase change material may be changed from crystalline phase to amorphous phase by heating with a heater or by passing current directly through the phase change material, and thereafter quenched quickly by dissipating heat into a substrate. The phase change material may be changed from the amorphous phase to a crystalline phase by heating at a lower temperature. An application of the actuator is described to fabricate a phase change nano relay in which the volumetric expansion of the actuator is used to push a contact across an airgap to bring it into contact with a source/drain.

12 Claims, 9 Drawing Sheets

(56) References Cited

U.S. PATENT DOCUMENTS

| | | | | |
|---|---|---|---|---|
| 7,755,899 | B2 | 7/2010 | Stenmark | |
| 8,314,983 | B2 * | 11/2012 | Frank | B81B 3/0072 359/221.1 |
| 9,368,720 | B1 | 6/2016 | Moon | |
| 10,461,253 | B1 * | 10/2019 | Slovin | H10N 70/231 |
| 10,700,270 | B2 * | 6/2020 | Borodulin | H10N 70/061 |
| 2009/0040007 | A1 | 2/2009 | Stenmark | |
| 2009/0278111 | A1 | 11/2009 | Pop | |
| 2011/0038093 | A1 | 2/2011 | Furukawa | |
| 2014/0264230 | A1 | 9/2014 | Borodulin | |
| 2014/0266300 | A1 | 9/2014 | Sherwin | |
| 2014/0266517 | A1 * | 9/2014 | Werner | H01P 1/10 333/262 |
| 2016/0035973 | A1 | 2/2016 | Raieszadeh | |
| 2016/0079019 | A1 * | 3/2016 | Borodulin | H10N 70/231 337/396 |
| 2016/0172113 | A1 * | 6/2016 | Reig | H01G 7/06 361/278 |
| 2018/0286617 | A1 * | 10/2018 | Blemel | G09G 3/3677 |
| 2020/0058869 | A1 * | 2/2020 | Slovin | H10N 70/861 |

OTHER PUBLICATIONS

International Search Report and Written Opinion for International Patnet Application No. PCT/US2019/067128 mailed on Jun. 2, 2020, 10 pages.

Wang et al., “Directly Heated Four Terminal Phase Change Switches,” IEEE MTT-S International Microwave Symposium (IMS2014), Jun. 1-6, 2014, 4 pages.

Zhou et al., “A Zero Density Change Phase Change Memory Material: GeTe—O Structural Characteristics Upon Crystallization,” Scientific Reports, vol. 5, Article No. 11150: 13 pages (Jun. 11, 2015).

* cited by examiner (A)

4. On
Amorphous phase
Contact touches D/S (B)

5. Switching
Joule heating of heater
Heats PC material (C)

6. Off
Converts to crystalline phase
Contact does not touch D/S

1. Off
Crystalline phase
Contact does not touch D/S

2. Switching
Joule heating of heater
Melts PC material

3. On
Quench in amorphous phase
Contact touches D/S

4. On
Amorphous phase
Contact touches D/S

5. Switching
Joule heating of heater
Heats PC material

6. Off
Converts to crystalline phase
Contact does not touch D/S

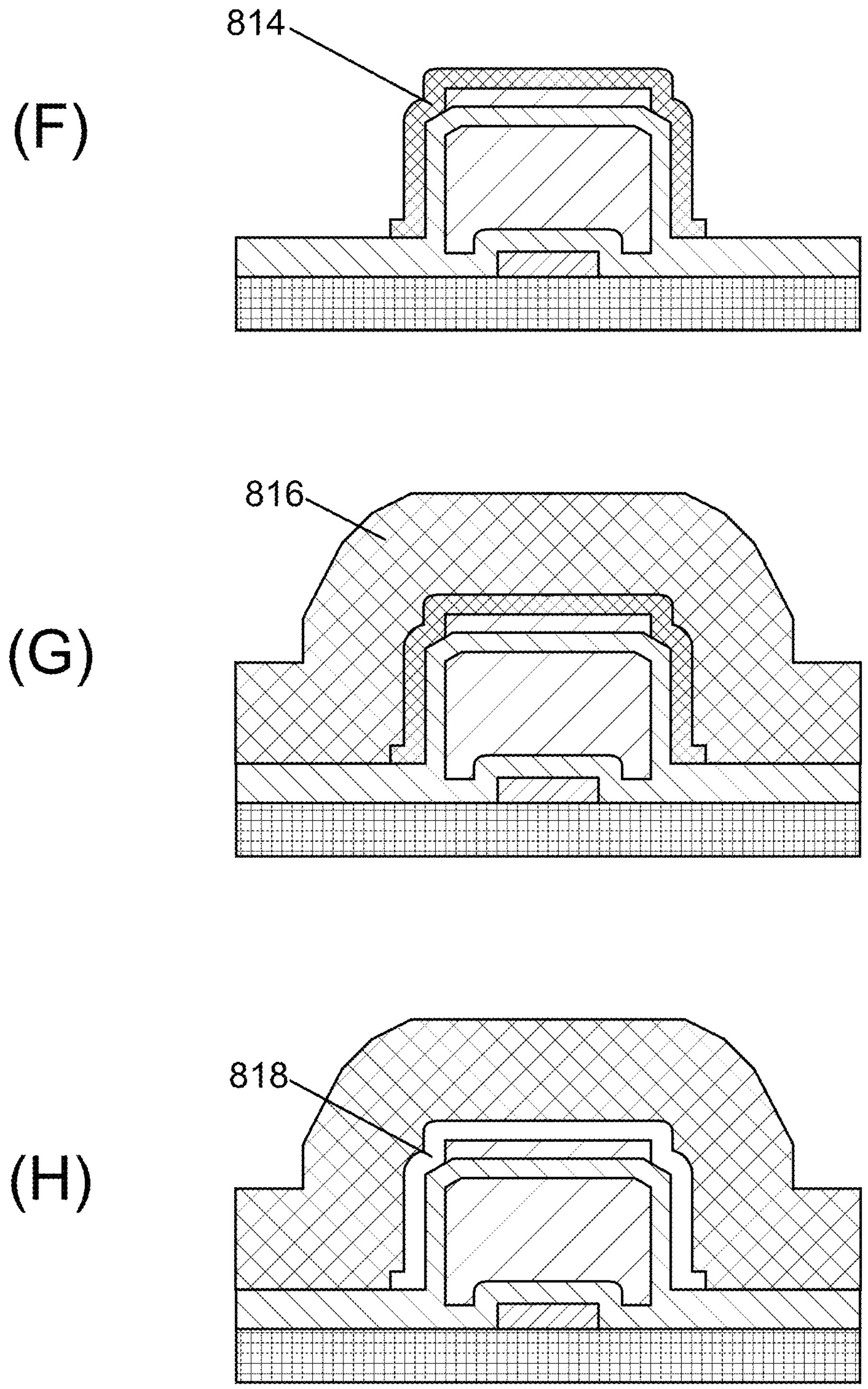
FIG. 8,
Cont.

PHASE CHANGE NANO ELECTRO-MECHANICAL RELAY

RELATED APPLICATIONS

This application is a divisional filing of U.S. patent application Ser. No. 17/294,906, filed May 18, 2021, which is a national phase filing under 35 U.S.C. § 371 claiming the benefit of and priority to International Patent Application No. PCT/US2019/067128, filed on Dec. 18, 2019, which claims the benefit of U.S. Provisional Patent App. No. 62/917,630, filed Dec. 19, 2018, the contents of which are incorporated herein in their entirety.

BACKGROUND OF THE INVENTION

Semiconductor-based materials, such as vanadium oxide ($V0_2$), have been used for the synthesis of very high work density actuators by exploiting thermally-induced phase change transformation. Germanium Telluride (GeTe) is a phase change material that can be transitioned from a crystalline phase to an amorphous phase upon when heated to −1000° K (sufficient to melt the material) and quickly quenched. The transition to the amorphous phase results in a volumetric increase of about 10%. This transition is reversible in nature, as the material undergoes a transition from an amorphous phase to a crystalline phase upon heating to −500° K, resulting in a decrease in volume of the material.

SUMMARY OF THE INVENTION

GeTe, as a semiconductor material with one of the largest work densities, is used herein for the making of micro/nanoscale actuators based on a volumetric change resulting from a transition from a crystalline phase to an amorphous phase and back to a crystalline phase. The change in volume of the material when undergoing a phase transition can be used to fabricate micro/nanoscale actuators, which can be used to fabricate micro/nano relays and other devices. Different from any other phase change material, GeTe is inherently non-volatile, making it of particular interest for applications in MEMS/NEMS relays or micro/nano robotics.

DETAILED DESCRIPTION

Figure 1:
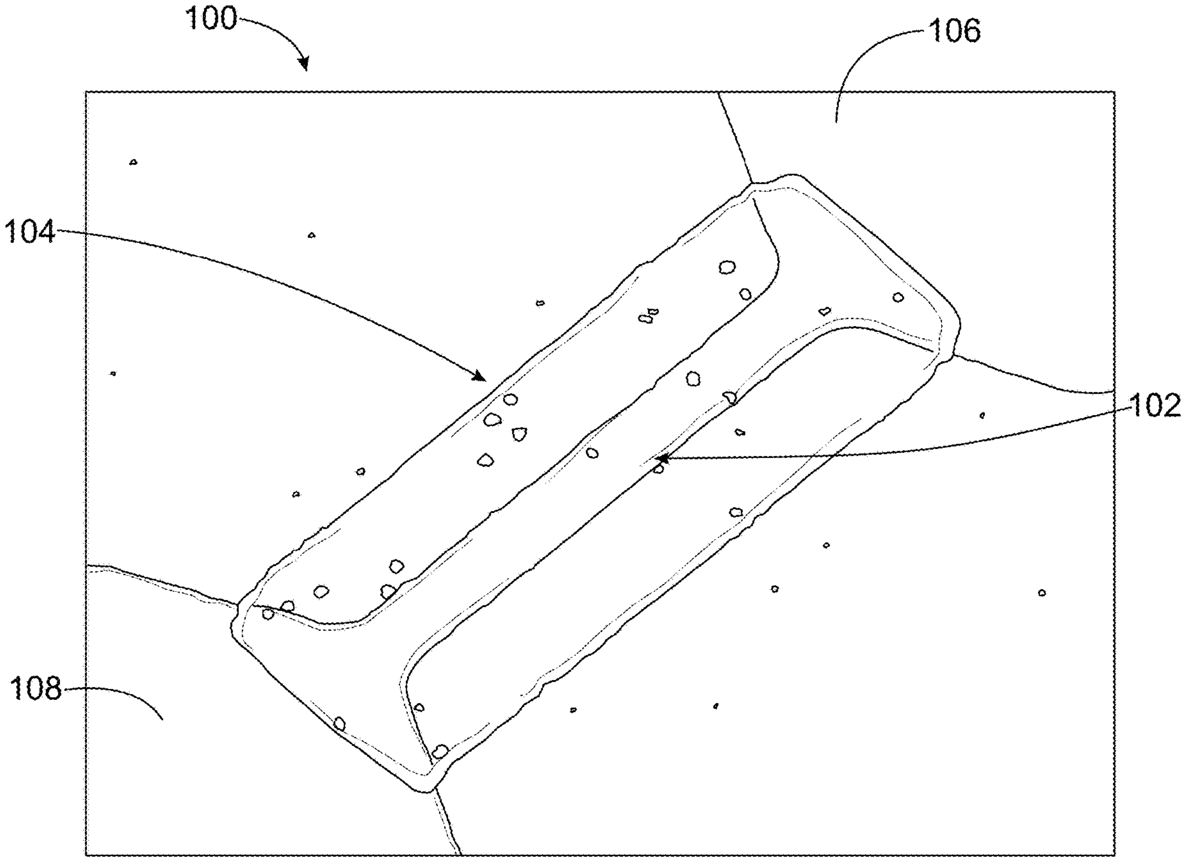
FIG. 1 is a schematic representation of a GeTe phase-change actuator.

A phase change MEMS actuator 100 is shown in FIG. 1 and consists of three main components: the heater 102, phase change material (PCM) 104, and cap (not shown). Heater 102 is a thin wire capable of rapidly reaching the melting temperature of PCM 104. PCM 104 sits on top of heater 102, isolated by a thin insulator to prevent current from flowing within PCM 104. The cap is a thin insulator that protects PCM 104 from the atmosphere and reduces reflow of PCM 104 when in the liquid state. The device 100 is switched by pulses through heater 102. One heater electrode 106 is held at ground while square voltage pulses or another voltage waveform is applied to the other electrode 108. PCM 104 is converted to the amorphous (volumetrically larger) state by melting and quenching the material. Quenching must be fast enough to prevent crystallization from occurring within the heated area. This can be accomplished by rapidly dissipating heat into the substrate. PCM 104 is converted back to the crystalline (volumetrically smaller) state by heating the material to promote rapid crystallization.

The phase change materials for the actuator may be chalcogenide glasses (e.g. GeTe, GeSbTe, and other compounds), perovskite nickelates (e.g. $NdNiO_3$, $SmNiO_3$) or more generally rare earth perovskites, $RNiO_3$ (where R=rare earth). The heater, contact metals, source and drain may be any metal, any refractory material (e.g. W, Mo, Ru etc.), conductive oxides (e.g. $RuO_2$, $TaO_2$) or conductive nitrides (TiN, TaN).

In a preferred embodiment of the invention, the phase change material is GeTe. In one embodiment, the actuator may have the following dimensions: thickness: 200 nm, width: 5.5 μm, length: 15 μm. The actuator may be fabricated on a substrate of AlN on Si having a thickness of approximately 100 nm. The heater may be composed of W and may have the following dimensions: thickness: 50 nm, width: 1.5 μm, length: 11 μm. The cap may be composed of an insulator, for example $Al_2O_3$, and may be approximately 20 nm in thickness. It should be realized that the dimensions provided are exemplary only and that the dimensions of the components of the actuator may vary based on application, fabrication method and chosen materials.

In an alternate embodiment of the invention, the phase change material may be conductive and the transition between phases can be accomplished by applying a voltage to the phase change material.

Figure 2:
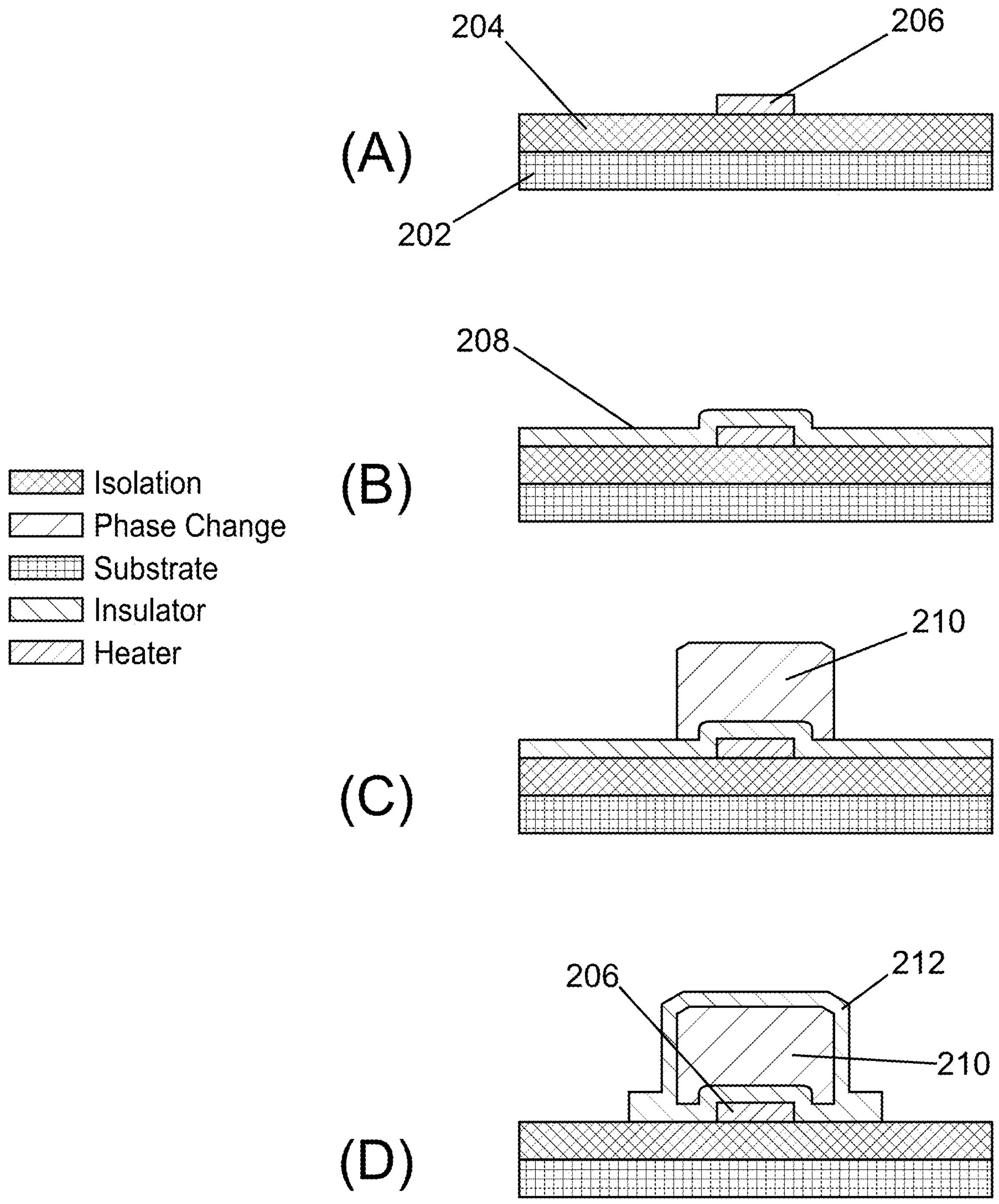
FIG. 2 shows a fabrication flow for a phase change mechanical actuator.

An exemplary phase change actuator may be fabricated following the process shown in FIG. 2. As shown in View (A), fabrication starts on a silicon wafer 202. Wafer 202 is initially patterned and etched with alignment marks for future lithography steps. Wafer 202 is then coated with a 100 nm AIN isolation layer 204. The AIN layer 204 is compatible with subsequent high temperature processes and acts as an etch stop when patterning the heater. The AIN layer 204 is highly thermally conductive, ensuring the GeTe can be quenched in the amorphous state. Next, the heater 206 is added by depositing a layer of tungsten by sputtering at an elevated substrate temperature of 850° C. The high substrate temperature during deposition is needed to deposit low resistivity tungsten, which is required for high-reliability heaters. The heater 206 is then patterned by an $SF_6$ reactive ion etch, stopping on the base AIN layer 204. Next, as shown in View (B), a conformal isolation layer 208 of 10 nm thick $Al_2O_3$ is deposited by atomic layer deposition (ALD). The isolation layer 208 is needed to prevent joule heating in the GeTe 210. Without this layer, the melted portion of GeTe 210 is not contained by solid GeTe 210, which may result in a "blow out." Next, GeTe 210 is deposited by co-sputtering Ge and Te at an elevated substrate temperature of 400° C. The elevated substrate temperature is required to ensure the deposited GeTe 210 is in the crystalline state. As shown in View (C), the GeTe 210 is then patterned by an Ar plasma etch, stopping on the $Al_2O_3$ isolation layer 208. Finally, the GeTe 210 is encapsulated in 20 nm of $Al_2O_3$ 212 deposited by ALD.

Figure 3:
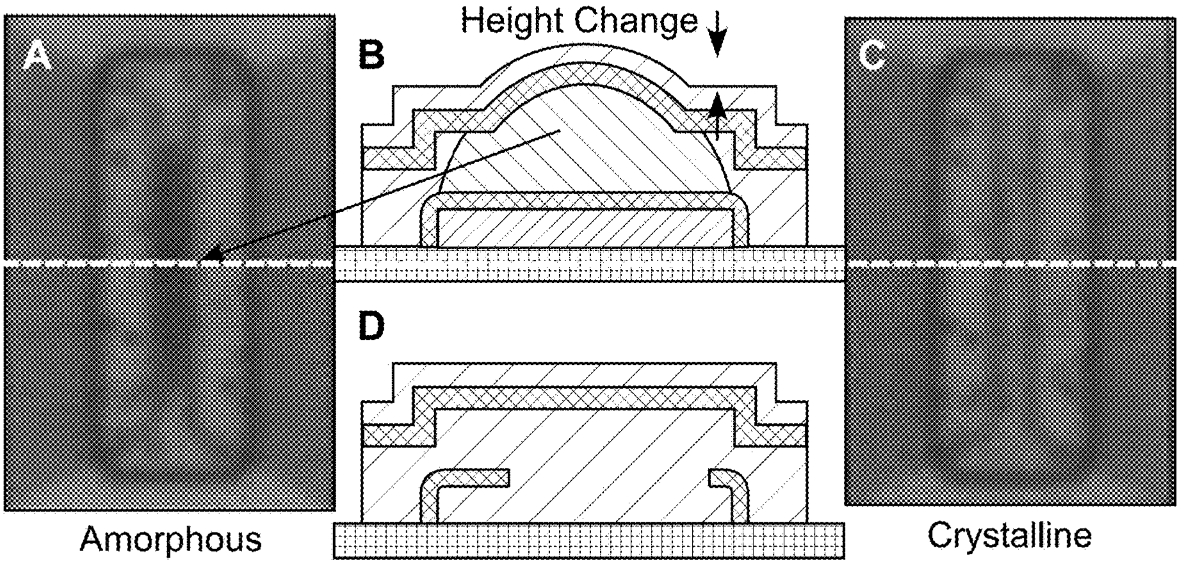
FIG. 3 is an optical microscope image of a fabricated device showing the phase change material in both amorphous and crystalline phases.

The device may be actuated using a 7 V 200 ns pulse to convert the PCM to the amorphous state, or a 6 V 200 ns pulse to convert the PCM back to the crystalline state. Other waveforms and voltages may be equally effective. FIG. 3 shows optical images of a device switching between amorphous and crystalline states. The optical properties of GeTe change depending on the crystal structure. As fabricated, the GeTe is in the crystalline phase. View (A) shows an actuated device. The dark area over the heater is the GeTe converted to the amorphous phase. This area, melted and quenched during the actuation pulse, is where the actuator expands, as shown in View (B). Converting back to the crystalline state removes this dark section of GeTe, as shown in View (C), and contracts the actuator, as shown in View (D).

Figure 4:
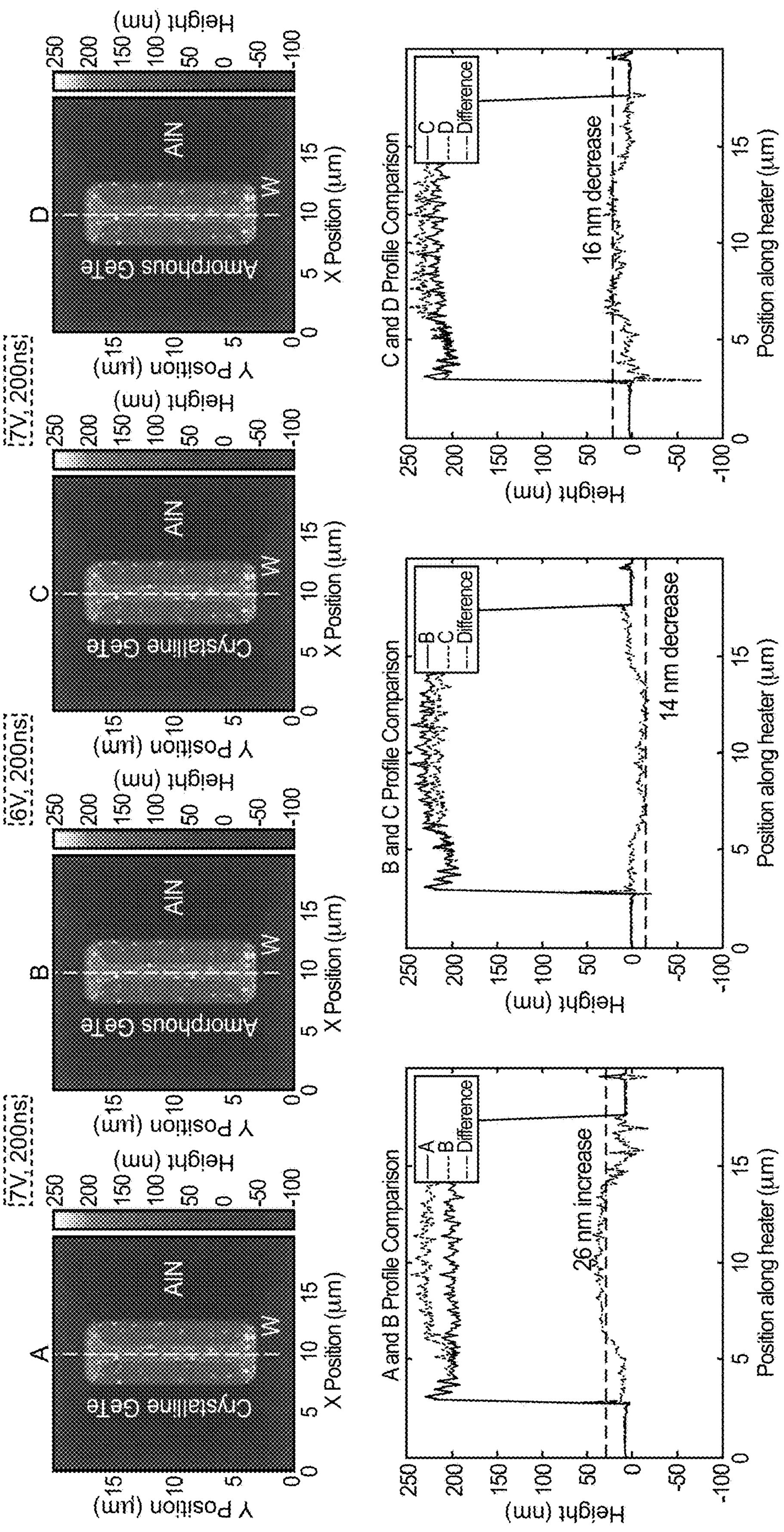
FIG. 4 shows multiple actuation cycles of a phase change NEMS actuator showing the differences in height above the heater of the phase change material between the amorphous and crystalline phases.

FIG. 4 shows profile measurements of a device over three consecutive switching events. All measurements are referenced to the heater electrodes. The patterned GeTe rises above the heater. A height cross-section is taken down the length of the heater. Profile A is the as-fabricated actuator. All of the PCM is in the crystalline state, leading to a flat cross-sectional profile. When a 7 V 200 ns pulse is applied to the device, the device shifts from profile A to profile B. A section of PCM over the heater rises, matching the profile of amorphous material seen in the example optical measurements of FIG. 3. The cross-sectional profiles A and B show a height difference between the two states. An average height increase of 26 nm was measured over the actuated area.

When a 6 V 200 ns pulse is applied to the device, the device shifts from profile B to profile C. The amorphous section of PCM contracts back to the crystalline state. The cross-sectional profiles of B and C show a height difference between the amorphous and re-crystalized PCM. An average height decrease of 14 nm was measured over the actuated area, approximately 7% of the fabricated PCM thickness.

When a second 7 V 200 ns pulse is subsequently applied to the device, the device shifts from profile C to profile D. The previously actuated section of PCM again expands. The cross-sectional profiles of C and D show a height difference between the previously re-crystalized and the amorphous PCM. An average height increase of 16 nm was measured over the actuated area, approximately 8% of the fabricated PCM thickness.

The mechanical phase change actuator is able to expand and contract depending on the magnitude and length of the applied voltage pulses. Profiles of dark areas seen in the optical microscope images in FIG. 3 match those of the raised profiles shown in FIG. 4. The initial expansion of the actuator is larger than the subsequent contraction and expansions. Inconsistent or inadequate heating of the PCM, heater expansion, and reflow of the PCM are possible causes for this change in the magnitude of the expansion.

The PCM-based actuator is a new class of non-volatile MEMS actuator based on GeTe phase change material, which exhibits a large volumetric increase when converting from crystalline to amorphous phases. The demonstrated actuator is capable of unidirectional strain up to 7% by confining the GeTe, allowing only expansion in the vertical direction. Phases are switched by pulsing a heater to melt and quench or heat the PCM to convert to the amorphous or crystalline phases respectively. Both amorphous and crystalline phases are stable at room temperature, making the actuator non-volatile. An average 14 nm thickness difference is achievable between amorphous and crystalline phases for a 200 nm thick GeTe actuator.

The actuator may have many practical applications in situations where movement is required in MEMS or NEMS devices. One such application is the fabrication of a phase change NEMS relay. The phase change NEMS Relay (PCNR) is a novel NEMS relay built on the phase change mechanical actuator previously described. The PCNR is actuated by the volumetric differences seen in the different phases of a phase change material. Some phase change materials, namely GeTe, have been observed to exhibit up to a 10% volume change when switching between the amorphous (larger) and crystalline phases (smaller). These phases can be toggled by thermal cycling with the steps shown in FIG. 5.

Figure 5:
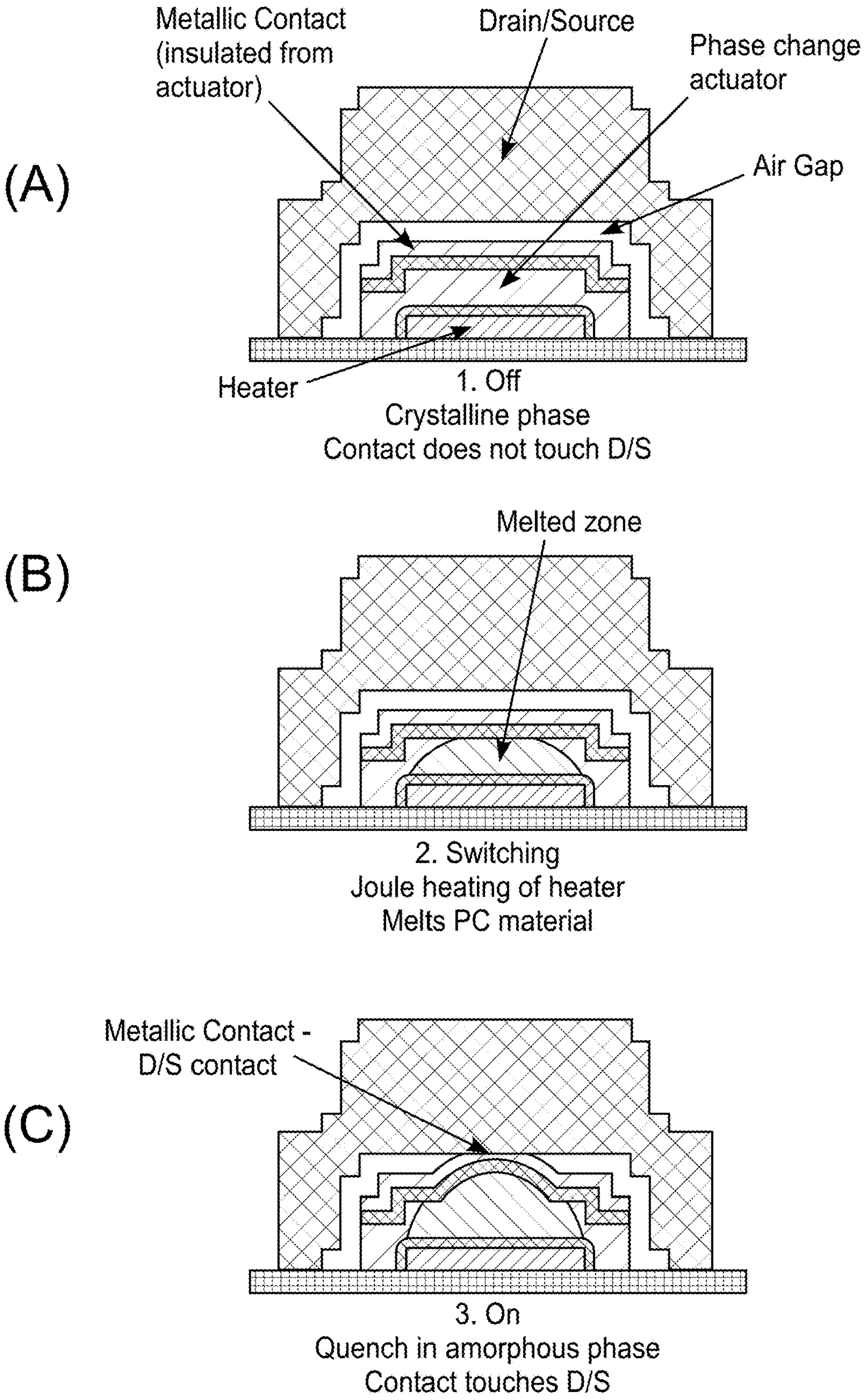
FIG. 5 is a schematic representation of the steps to turn a first embodiment of a NEMS relay from and off state to and on state.

View (A) of FIG. 5 shows the device in the "off" state, wherein the phase change actuator is in the crystalline phase. The metallic contact is separated from the drain/source by an air gap and from the phase change actuator by a layer of insulating material. In View (B), the heater has been turned on by applying a pulsed voltage to the electrodes of the heater, thereby melting a portion of the phase change actuator, which is forced in the direction of the metallic contact by containment by the un-melted portion of the phase change material. The phase change material initially expands when melted, thereby pushing the metallic contact through the air gap, and forcing it against the drain/source. The device is switched "on". In View (C), the heater has been switched off and the phase change actuator is allowed to quench by having the heat quickly dissipate into the substrate via the highly-thermally-conductive AlN Layer. After quenching, the portion of the phase change actuator which was previously melted, as shown in View (B), is locked in the expanded amorphous phase, thereby keeping the metallic contact pressed against drain/source. The device is now held "on".

Figure 6:
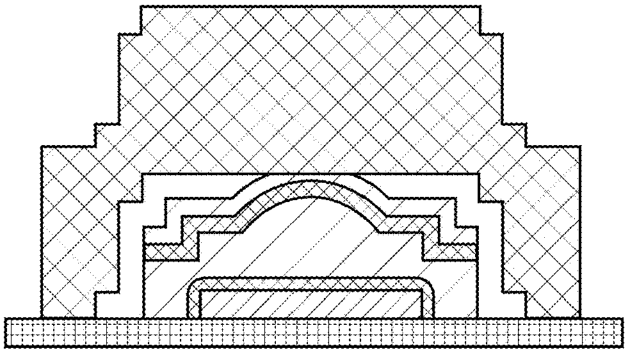
FIG. 6 is a schematic representation of the steps to turn the first embodiment of the NEMS relay from an on state to an off state.
Figure 6:
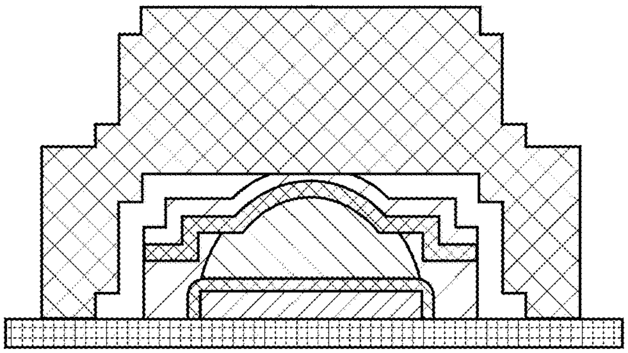
Figure 6:
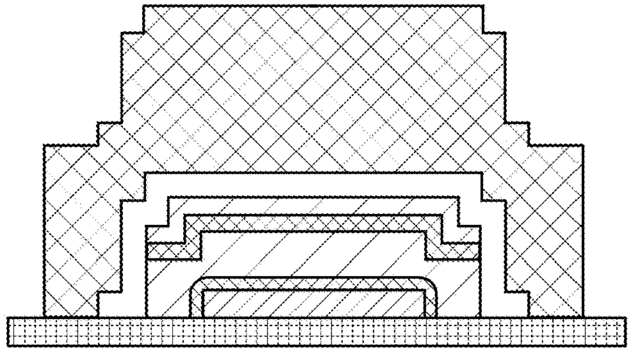

View (A) of FIG. 6 shows the device in the "on" state with the metallic contact touching the drain/source. In View (B), the heater is switched on, heating the amorphous phase change actuator at a lower temperature than in View (B) of FIG. 5. This may be accomplished by applying a lower pulsed voltage or shorter pulse time to generate heat sufficient to transition the phase change material from the amorphous phase to the crystalline phase, but not sufficient to melt the material. In View (C), the phase change actuator is converted to a crystalline phase, which is smaller in size and does not push the metallic contact across the air gap into contact with the drain/source. Because the air gap now separates the metallic contact from the drain/source, the device has been switched "off".

Figure 7:
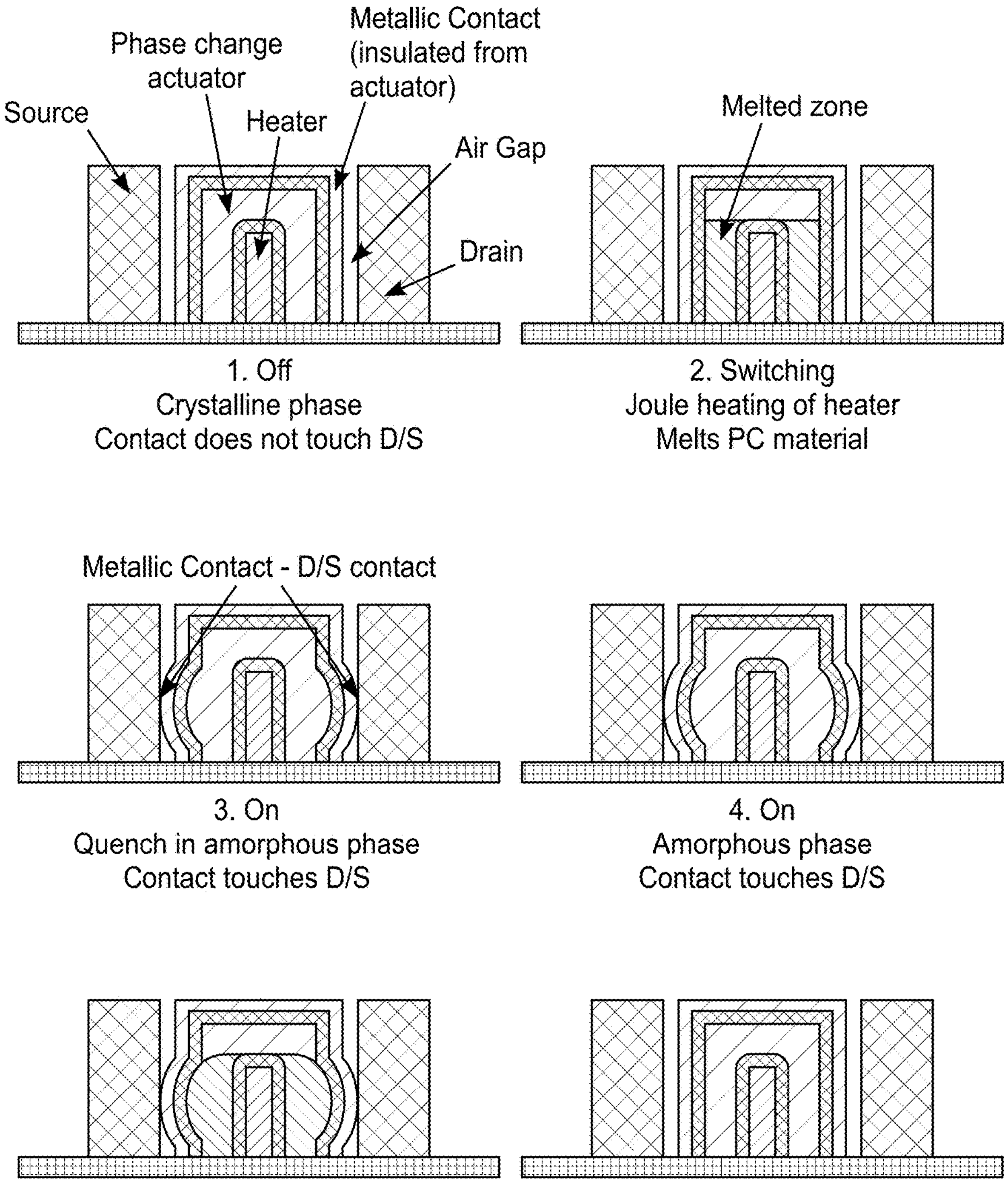
FIG. 7 is a schematic representation of the steps to turn a second embodiment of a NEMS relay from an off state to a on state and back to the off state.

An alternative "fin" geometry is shown toggling states in FIG. 7. While built differently, both geometries use the same process to switch states. Expansion requires melting and rapidly quenching the material to change it to an amorphous phase. Contraction requires an elevated temperature, below the melting point, to facilitate a change to the crystalline phase in the material. The large volumetric change between the two phases in the phase change material open and close air gaps for the PCNR. The phase change material also makes the device inherently non-volatile. As can be seen, the phase change actuator is heated and pushes metallic contacts in a direction orthogonal to the substrate, where they push the metallic contact across the air gap into contact with the drain/source.

Figure 8:
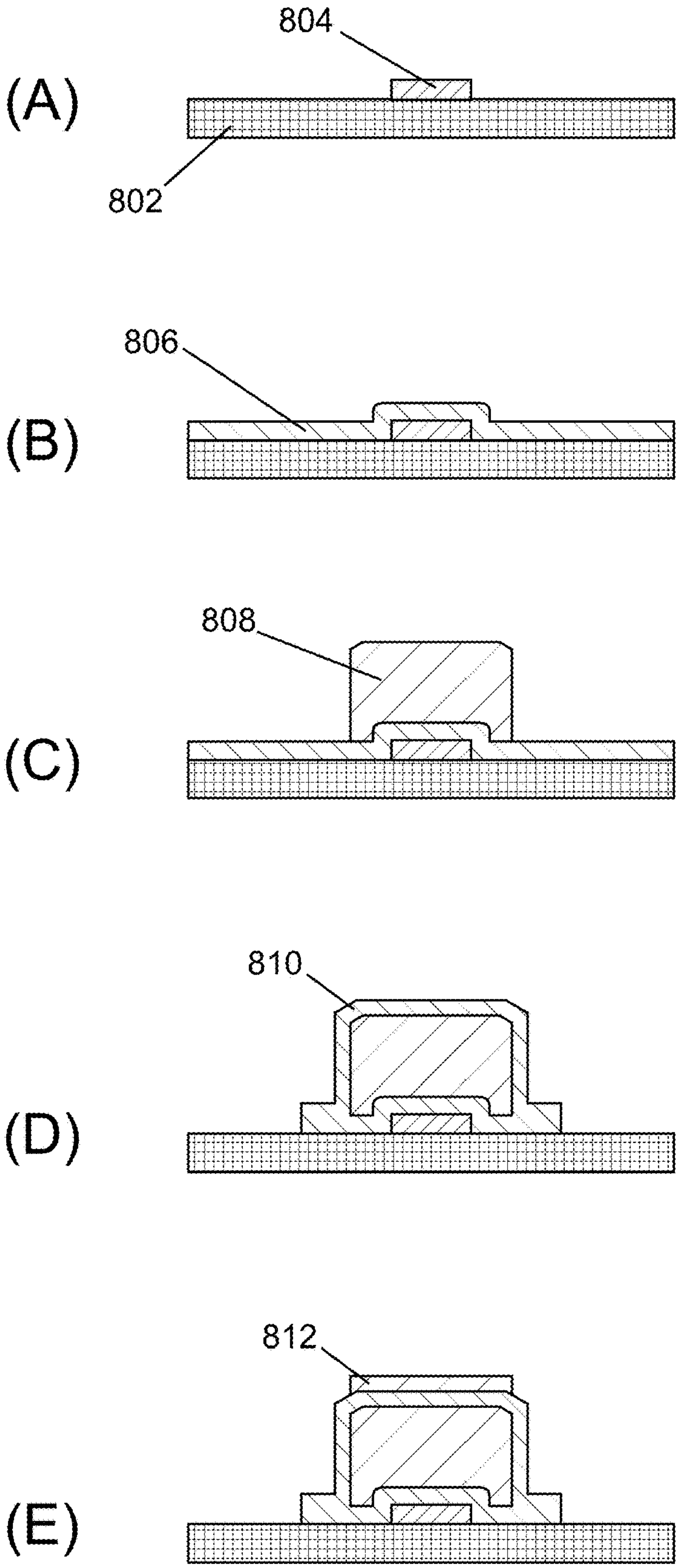
FIG. 8 is a schematic representation of the steps to fabricate the first embodiment of the NEMS relay.

The PCNR is fabricated in an 8-step process, shown in FIG. 8. The first 4 steps are the similar to those in the previously described phase change mechanical actuator fabrication. In View (A), a silicon wafer 802 is initially patterned and etched with alignment marks for future lithography steps and coated with a 100 nm AlN isolation layer (not shown). The AlN isolation layer is compatible with subsequent high temperature processes and acts as an etch stop when patterning the heater. The AlN isolation layer is highly thermally conductive, ensuring the GeTe can be quenched in the amorphous phase. Next, heater 804 is deposited, comprising, in a preferred embodiment, a layer of tungsten (W) deposited by sputtering at an elevated substrate temperature of 850° C. Other conductive materials may also be suitable from which to fabricate the heater. The high substrate temperature during deposition is needed to deposit the low resistivity tungsten required for high-reliability heaters. Heater 804 is then patterned by an $SF_6$ reactive ion etch, stopping on the base AlN isolation layer. Next, as shown in View (B), a conformal isolation layer 806 of 10 nm thick $Al_2O_3$ is deposited by ALD. Layer 806 is needed to prevent joule heating in the GeTe. Without layer 806, the melted portion of GeTe cannot be contained by solid GeTe, which may result in a "blow out." GeTe 808 is then deposited, as shown in View (C), by co-sputtering Ge and Te at an elevated substrate temperature of 400° C. The elevated substrate temperature is required to ensure the deposited GeTe is in the crystalline state. The GeTe 808 is then patterned by an Ar plasma etch, stopping on the $Al_2O_3$ isolation layer 806. In View (D), the GeTe 808 is encapsulated in a layer of 20 nm of $Al_2O_3$ 810 deposited by ALD.

After fabrication of the actuator, 30 nm of W is deposited and patterned, as shown in View (E), to form the metallic contact 812 for the relay. Next, 20 nm of $SiO_2$ is deposited by ALD as a sacrificial layer 814 and patterned with a $CHF_4$ plasma etch. Sacrificial layer 814 is necessary to set the air gap for the relay. In View (G), cap 816, comprising 500 nm of W is deposited and patterned to form the drain and source. The thick layer helps to mitigate changes in gap size caused by residual stress. Finally, the relay is released by a vapor HF etch, removing the $SiO_2$ sacrificial material to form air gap 818.

An alternate embodiment of the PNCR may utilize the alternate embodiment of the actuator described above, in which the heater is eliminated and a voltage is applied directly to the phase change material to bring about the phase transition. In this case, the phase change material may be completely melted and will be contained by layer 810 of $Al_2O_3$.

As may be realized by one of skill in the art, the phase change actuator described herein can be utilized for many different applications, including the described phase change nano relay. Both the actuator and the phase change nano relay have been described in terms of the use of specific materials and dimensions. It should be noted that the specific materials and dimensions are exemplary in nature and different combinations of materials and dimensions are possible without deviating from the intended scope of the invention.

We claim:

1. An electrical relay comprising:

a substrate;

a phase change material, covering a portion of the substrate;

an insulating layer encapsulating the phase change material;

a first metallic contact, at least partially covering the insulating material;

a second metallic contact disposed adjacent to the first metallic contact and separated therefrom by an air gap;

wherein heating the phase change material past its melting point to a first temperature and quickly quenching the phase change material changes all or a portion of the phase change material from a crystalline phase to an amorphous phase;

wherein the phase change material exhibits an increase in volume when in the amorphous phase; and wherein the increase in volume of the phase change material causes the first metallic contact to deform and cross the air gap to contact the second metallic contact thereby establishing an electrical connection between the first metallic contact and the second metallic contact.

2. The electrical relay of claim 1 wherein the phase change material is heated by passing a current through the phase change material.

3. The electrical relay of claim 1, further comprising:

a heater, disposed between the substrate and the phase change material, the heater heating the phase change material when a current is passed through the heater.

4. The electrical relay of claim 3, the heater comprising a tungsten wire.

5. The electrical relay of claim 2, the phase change material changing from the amorphous phase to the crystalline phase when heated to a second temperature, lower than the first temperature.

6. The electrical relay of claim 5, the phase change material exhibiting a decrease in volume when changed from the amorphous phase to the crystalline phase.

7. The electrical relay of claim 6, the phase change material releasing the first metallic contact from contact with the second metallic contact and re-establishing the air gap between the first metallic contact in the second electrical contact when changed from the amorphous phase to the crystalline phase.

8. An electrical relay comprising:

a first metallic contact;

one or more second metallic contacts, separated from the first metallic contact by an air gap;

a phase change material; and an insulating material encapsulating the phase change material and thereby separating the phase change material from the first metallic contact;

wherein transitioning the phase change material from a crystalline phase to an amorphous phase increases the volume of the phase change material such as to cause the first metallic contact to deform, thereby crossing the air gap and contacting the one or more second metallic contacts, enabling electrical conductivity therebetween.

9. The electrical relay of claim 8, wherein transitioning the phase change material from the crystalline phase to the amorphous phase results from heating the phase change material to a first temperature at or above the melting point of the phase change material.

10. The electrical relay of claim 9, wherein heating the encapsulated phase change material to a second temperature, below the melting point of the phase change material, changes the phase change material from the amorphous phase to the crystalline phase, thereby decreasing the volume of the phase change material such as to release the first metallic contact from the one or more second metallic contacts to reestablish the air gap between the first metallic contact and the one or more second metallic contacts.

11. The electrical relay of claim 8 wherein the transition from the crystalline phase to the amorphous phase results from applying a voltage to the phase change material.

12. The electrical relay of claim 10, further comprising a heater to heat the phase change material to the first and second temperatures.

* * * * *